(12) United States Patent
Bernhagen et al.

(10) Patent No.: US 11,584,041 B2
(45) Date of Patent: Feb. 21, 2023

(54) REINFORCED PULTRUSION MEMBER AND METHOD OF MAKING

(71) Applicant: Pella Corporation, Pella, IA (US)

(72) Inventors: Todd A. Bernhagen, Pella, IA (US); Christopher D. Smith, Murray, KY (US)

(*) Notice: Subject to any disclaimer, the term of this patent is extended or adjusted under 35 U.S.C. 154(b) by 174 days.

(21) Appl. No.: 16/390,661

(22) Filed: Apr. 22, 2019

(65) Prior Publication Data

US 2019/0322008 A1    Oct. 24, 2019

Related U.S. Application Data

(60) Provisional application No. 62/660,705, filed on Apr. 20, 2018.

(51) Int. Cl.
| | | |
|---|---|---|
| *B29B 15/12* | (2006.01) | |
| *B29C 70/10* | (2006.01) | |
| *B29C 70/52* | (2006.01) | |
| *B29K 105/08* | (2006.01) | |
| *B29K 101/12* | (2006.01) | |

(52) U.S. Cl.
CPC .............. *B29B 15/12* (2013.01); *B29C 70/10* (2013.01); *B29C 70/521* (2013.01); *B29K 2101/12* (2013.01); *B29K 2105/08* (2013.01)

(58) Field of Classification Search
CPC ....... B29B 15/12; B29C 70/10; B29C 70/521; B29K 2101/12; B29K 2105/08
See application file for complete search history.

(56) References Cited

U.S. PATENT DOCUMENTS

| | | |
|---|---|---|
| 701,088 A | 5/1902 | Ray |
| 2,962,133 A | 11/1960 | Kivett et al. |
| 3,189,140 A | 6/1965 | Luss |
| 3,290,847 A | 12/1966 | Fenwick |
| 3,471,598 A | 10/1969 | Battista |
| 3,527,011 A | 9/1970 | Bloom et al. |

(Continued)

FOREIGN PATENT DOCUMENTS

| | | |
|---|---|---|
| CA | 1132849 A | 10/1982 |
| CA | 1165348 A | 4/1984 |

(Continued)

OTHER PUBLICATIONS

Definition of aperture (Year: 2021).*

(Continued)

*Primary Examiner* — Travis M Figg
(74) *Attorney, Agent, or Firm* — Faegre Drinker Biddle & Reath LLP; Victor Jonas; Elizabeth Sullivan (57) ABSTRACT

A reinforced pultruded profile having a top edge, a bottom edge spaced along a vertical axis extending between the top edge and the bottom edge, a transverse axis oriented perpendicular to the vertical axis, and a machine axis oriented along a length of the profile. The pultruded profile includes a first reinforcing layer spaced along the vertical axis and oriented along the transverse axis, a second reinforcing layer spaced along the vertical axis and oriented along the transverse axis, and a first structural layer located between the first reinforcing layer and the second reinforcing layer, the first structural layer having a modulus of elasticity of at least 175 GPa.

12 Claims, 6 Drawing Sheets

(56) References Cited

U.S. PATENT DOCUMENTS

| | | | |
|---|---|---|---|
| 3,685,227 A | 8/1972 | Grisard et al. |
| 3,734,552 A | 5/1973 | Haxton |
| 3,798,690 A | 3/1974 | Moore |
| 3,810,337 A | 5/1974 | Pollard |
| 3,816,011 A | 6/1974 | Biebuyck et al. |
| 4,068,423 A | 1/1978 | Marsh |
| 4,070,838 A | 1/1978 | Kuhn |
| 4,099,808 A | 7/1978 | Oakley et al. |
| 4,115,972 A | 9/1978 | Varlonga |
| 4,205,497 A | 6/1980 | Schirm |
| 4,282,687 A | 8/1981 | Teleskivi |
| 4,311,183 A | 1/1982 | Herbst et al. |
| 4,422,280 A | 12/1983 | Mertin et al. |
| 4,432,166 A | 2/1984 | Weimar |
| 4,553,286 A | 11/1985 | Schwarz, II |
| 4,608,793 A | 9/1986 | Yost et al. |
| 4,643,005 A | 2/1987 | Logas |
| 4,738,069 A | 4/1988 | Williams |
| 4,752,513 A | 6/1988 | Rau et al. |
| 4,771,988 A | 9/1988 | Scroggins, Sr. |
| 4,831,804 A | 5/1989 | Sayer |
| 4,833,803 A | 5/1989 | Schwartz |
| 4,924,631 A | 5/1990 | Davies et al. |
| 4,995,213 A | 2/1991 | Bezubic |
| 5,005,333 A | 4/1991 | Ott |
| 5,039,571 A * | 8/1991 | Vogelesang ............. B32B 15/14 428/458 |
| 5,347,686 A | 9/1994 | Tyler et al. |
| 5,360,246 A | 11/1994 | Leiter et al. |
| 5,402,608 A | 4/1995 | Chu |
| 5,487,937 A | 1/1996 | Newby |
| 5,560,164 A | 10/1996 | Ahrens |
| 5,570,548 A | 11/1996 | Hopper |
| 5,619,823 A | 4/1997 | Ruff et al. |
| 5,634,306 A | 6/1997 | Riegelman |
| 5,644,881 A | 7/1997 | Neilly |
| 5,647,172 A | 7/1997 | Rokicki |
| 5,690,363 A | 11/1997 | Rybinski |
| 5,702,816 A | 12/1997 | Kaiser |
| 5,704,178 A | 1/1998 | Ciao |
| 5,822,926 A | 10/1998 | Koike et al. |
| 5,851,609 A | 12/1998 | Baratuci et al. |
| 5,876,553 A | 3/1999 | Kaiser |
| 5,908,689 A | 6/1999 | Dana et al. |
| 5,910,458 A | 6/1999 | Beer et al. |
| 5,927,647 A | 7/1999 | Masters et al. |
| 5,931,520 A | 8/1999 | Seksaria et al. |
| 5,950,380 A | 9/1999 | Pearson |
| 5,965,262 A | 10/1999 | Whisler et al. |
| 5,989,376 A | 11/1999 | Kusy et al. |
| 6,003,277 A | 12/1999 | Graham et al. |
| 6,024,908 A | 2/2000 | Koncelik |
| 6,054,699 A | 4/2000 | Kim et al. |
| 6,055,783 A | 5/2000 | Guhl et al. |
| 6,065,323 A | 5/2000 | Arduino et al. |
| 6,065,540 A | 5/2000 | Thomeer et al. |
| 6,151,947 A | 11/2000 | Arduino et al. |
| 6,185,882 B1 | 2/2001 | Pearson |
| 6,227,609 B1 | 5/2001 | Meilis |
| 6,260,912 B1 | 7/2001 | Mondragon Sarmiento et al. |
| 6,286,288 B1 | 9/2001 | France |
| 6,315,351 B1 | 11/2001 | Mondragon Sarmiento et al. |
| 6,493,914 B2 | 12/2002 | Kaiser et al. |
| 6,800,164 B2 | 10/2004 | Brandstrom |
| 6,872,273 B2 | 3/2005 | Davies et al. |
| 6,966,945 B1 | 11/2005 | Mazany et al. |
| 6,986,859 B2 | 1/2006 | Mazany et al. |
| 7,010,888 B2 | 3/2006 | Tumlin et al. |
| 7,082,727 B2 | 8/2006 | Schmidt |
| 7,100,335 B2 | 9/2006 | Plummer et al. |
| 7,111,433 B2 | 9/2006 | Kerscher |
| 7,159,370 B2 | 1/2007 | Oliphant et al. |
| 7,179,522 B2 | 2/2007 | Hiel et al. |
| 7,255,333 B2 | 8/2007 | Casper et al. |
| 7,297,740 B2 | 11/2007 | Dyksterhouse |
| 7,316,446 B2 | 1/2008 | Wikstrom |
| 7,414,090 B2 | 8/2008 | Wang et al. |
| 7,491,356 B2 | 2/2009 | Heikkila |
| 7,520,099 B2 | 4/2009 | Pringle et al. |
| 7,521,385 B2 | 4/2009 | Ahluwalia |
| 7,540,250 B2 | 6/2009 | Sjostedt et al. |
| 7,563,733 B2 | 7/2009 | Ahluwalia et al. |
| 7,588,653 B2 | 9/2009 | Crandell et al. |
| 7,594,361 B2 | 9/2009 | Tragant Ruano |
| 7,732,358 B2 | 6/2010 | Mazany et al. |
| 7,739,851 B2 | 6/2010 | Davis et al. |
| 7,743,584 B2 | 6/2010 | Reichert et al. |
| 7,815,247 B2 | 10/2010 | Obayashi |
| 7,866,569 B2 | 1/2011 | Cadwell |
| 7,951,449 B2 | 5/2011 | Ma et al. |
| 7,981,819 B2 | 7/2011 | Ahluwalia |
| 8,002,249 B2 | 8/2011 | Casper et al. |
| 8,011,165 B2 | 9/2011 | Blahut |
| 8,017,531 B2 | 9/2011 | Ahluwalia et al. |
| 8,020,351 B2 | 9/2011 | Stephens |
| 8,020,352 B2 | 9/2011 | Aheam |
| 8,030,229 B2 | 10/2011 | Ahluwalia et al. |
| 8,037,803 B2 | 10/2011 | Friedman et al. |
| 8,070,348 B2 | 12/2011 | Khouri |
| 8,109,706 B2 | 2/2012 | Richards |
| 8,131,125 B2 | 3/2012 | de Montmorillon et al. |
| 8,141,307 B2 | 3/2012 | Hillman et al. |
| 8,146,321 B2 | 4/2012 | Plagemann et al. |
| 8,265,442 B2 | 9/2012 | Overton |
| 8,349,109 B2 | 1/2013 | Al-Emrani et al. |
| 8,359,814 B2 | 1/2013 | Williams |
| 8,398,149 B2 | 3/2013 | Weiter et al. |
| 8,402,705 B2 | 3/2013 | Petersen |
| 8,407,952 B2 | 4/2013 | Engelmeyer |
| 8,439,685 B2 | 5/2013 | Shelley |
| 8,484,916 B2 | 7/2013 | Farag |
| 8,491,046 B2 | 7/2013 | Nagai et al. |
| 8,561,365 B2 | 10/2013 | Albrecht et al. |
| 8,656,643 B2 | 2/2014 | Thielmann et al. |
| 8,672,006 B2 | 3/2014 | Moon |
| 8,813,442 B1 | 8/2014 | Edwards et al. |
| 8,863,454 B2 | 10/2014 | Davies et al. |
| 8,869,454 B2 | 10/2014 | Griffin, Jr et al. |
| 8,904,721 B2 | 12/2014 | Pantelides et al. |
| 8,919,070 B2 | 12/2014 | Moses et al. |
| 8,925,279 B2 | 1/2015 | Pantelides et al. |
| 8,945,694 B2 | 2/2015 | Aneja et al. |
| 9,005,768 B2 | 4/2015 | Mizrahi et al. |
| 9,114,761 B2 | 8/2015 | Schweindl et al. |
| 9,145,627 B2 | 9/2015 | Wilson et al. |
| 9,151,056 B2 | 10/2015 | Konstantin |
| 9,175,705 B1 | 11/2015 | Clark, Jr. et al. |
| 9,212,482 B2 | 12/2015 | Frederick |
| 9,244,220 B2 | 1/2016 | Overton |
| 9,267,542 B2 | 2/2016 | Scheibe et al. |
| 9,382,398 B1 | 7/2016 | Hughes |
| 9,394,432 B1 | 7/2016 | Hughes |
| 9,409,347 B2 | 8/2016 | Nelson et al. |
| 9,441,405 B2 | 9/2016 | Chubb et al. |
| 9,447,557 B2 | 9/2016 | Schiffmann et al. |
| 9,453,367 B1 | 9/2016 | Plummer |
| 9,512,656 B2 | 12/2016 | Lee |
| 9,528,266 B2 | 12/2016 | Konstantin |
| 9,624,712 B2 | 4/2017 | Bottin |
| 9,631,416 B2 | 4/2017 | Pulte et al. |
| 9,649,835 B2 | 5/2017 | Czerner |
| 9,663,946 B2 | 5/2017 | Frederick |
| 9,728,302 B1 | 8/2017 | McNutt |
| 9,745,749 B2 | 8/2017 | Ciuperca |
| 2002/0000173 A1 | 1/2002 | Cho |
| 2002/0014302 A1 | 2/2002 | Fanucci et al. |
| 2002/0123288 A1 * | 9/2002 | Davies ................ D04H 3/14 442/364 |
| 2003/0037397 A1 | 2/2003 | Buchanan et al. |
| 2003/0089066 A1 * | 5/2003 | Nelson ................ E04G 17/04 249/40 |
| 2003/0126812 A1 | 7/2003 | Folsom et al. |
| 2004/0250484 A1 | 12/2004 | Imai |
| 2005/0051279 A1 | 3/2005 | Hung |

(56) References Cited

U.S. PATENT DOCUMENTS

| | | |
|---|---|---|
| 2005/0126079 A1 | 6/2005 | Gerard |
| 2006/0051546 A1 | 3/2006 | Van Erp |
| 2006/0196132 A1 | 9/2006 | Ruano |
| 2006/0290166 A1 | 12/2006 | Gehringhoff et al. |
| 2007/0094935 A1 | 5/2007 | Molinari |
| 2007/0119112 A1 | 5/2007 | Goodman et al. |
| 2007/0187986 A1 | 8/2007 | Wikstrom |
| 2007/0266661 A1 | 11/2007 | Abbas-Ul-Husaini |
| 2008/0098676 A1 | 5/2008 | Hutchens |
| 2008/0178541 A1 | 7/2008 | Kerscher et al. |
| 2008/0246375 A1 | 10/2008 | Berg |
| 2008/0315628 A1 | 12/2008 | Obayashi |
| 2009/0013636 A1 | 1/2009 | Wilson |
| 2010/0199561 A1 | 8/2010 | Weiter et al. |
| 2010/0287855 A1 | 11/2010 | Stephens |
| 2011/0025076 A1 | 2/2011 | Shelley |
| 2011/0107722 A1 | 5/2011 | Engelmeyer |
| 2011/0123162 A1 | 5/2011 | Molin et al. |
| 2012/0212008 A1 | 8/2012 | Kanovsky |
| 2013/0004134 A1 | 1/2013 | Molin et al. |
| 2013/0042612 A1 | 2/2013 | Shapiro et al. |
| 2013/0042996 A1 | 2/2013 | Hwang et al. |
| 2013/0101845 A9 | 4/2013 | Hiel et al. |
| 2013/0133816 A1 | 5/2013 | Ziegler et al. |
| 2013/0195541 A1 | 8/2013 | Pantelides et al. |
| 2013/0334843 A1 | 12/2013 | Schweindl et al. |
| 2014/0045400 A1* | 2/2014 | Vandewalle ........ D06M 15/227 524/440 |
| 2014/0127451 A1 | 5/2014 | Pilpel et al. |
| 2014/0260063 A1 | 9/2014 | Edwards et al. |
| 2015/0024175 A1 | 1/2015 | Kelly et al. |
| 2015/0096257 A1 | 4/2015 | Sinnathamby et al. |
| 2015/0118393 A1* | 4/2015 | Ciuperca ............... B32B 15/046 427/209 |
| 2015/0121764 A1 | 5/2015 | Lee |
| 2015/0183930 A1 | 7/2015 | Hsueh et al. |
| 2015/0197929 A1 | 7/2015 | Segall |
| 2015/0219344 A1 | 8/2015 | Glover et al. |
| 2015/0354199 A1 | 12/2015 | Segall |
| 2015/0368955 A1 | 12/2015 | Zohar et al. |
| 2015/0376946 A1 | 12/2015 | Kurzer et al. |
| 2016/0090775 A1 | 3/2016 | Albrecht |
| 2016/0130389 A1 | 5/2016 | Dugar et al. |
| 2016/0160515 A1 | 6/2016 | Wallance |
| 2016/0251807 A1 | 9/2016 | Hawkins et al. |
| 2016/0257805 A1 | 9/2016 | Markgraf et al. |
| 2016/0339675 A1 | 11/2016 | Mizrahi |
| 2016/0367851 A1 | 12/2016 | Astilean et al. |
| 2017/0036428 A1 | 2/2017 | Richards et al. |
| 2017/0096831 A1 | 4/2017 | Britt, Jr. |
| 2017/0167185 A1 | 6/2017 | Boer |
| 2017/0218649 A1 | 8/2017 | Marks et al. |
| 2017/0239916 A1 | 8/2017 | Lewit et al. |
| 2017/0241134 A1 | 8/2017 | McCloud et al. |
| 2017/0254017 A1 | 9/2017 | Bertelo et al. |
| 2019/0322008 A1* | 10/2019 | Bernhagen .............. B29B 15/12 |
| 2020/0291717 A1 | 9/2020 | Bernhagen et al. |

FOREIGN PATENT DOCUMENTS

| | | |
|---|---|---|
| CA | 1252641 A | 4/1989 |
| CA | 1293284 C | 12/1991 |
| CA | 2044331 A1 | 12/1992 |
| CA | 2116768 A1 | 3/1993 |
| CA | 2282358 C | 8/1998 |
| CA | 2243225 C | 1/1999 |
| CA | 2463099 C | 5/2003 |
| CA | 2506006 A1 | 5/2004 |
| CA | 2567760 A1 | 1/2006 |
| CA | 2533057 C | 7/2007 |
| CA | 2636669 A1 | 7/2007 |
| CA | 2618610 A1 | 7/2008 |
| CA | 2745429 A1 | 6/2010 |
| CA | 2809699 A1 | 9/2014 |
| CA | 2882712 A1 | 8/2015 |
| CA | 2950781 C | 5/2017 |
| CA | 2958837 A1 | 8/2017 |
| CA | 2958839 A1 | 8/2017 |
| WO | 2013083664 A3 | 8/2013 |

OTHER PUBLICATIONS

Definition of ribbon (Year: 2021).*

Young's Modulus of Steel (https://amesweb.info/Materials/Youngs-Modulus-of-Steel.aspx which cites Metals Handbook. Properties and Selection: Irons, Steels, and High- Performance Alloys. ASM International, 1990) (Year: 1990).*

* cited by examiner

REINFORCED PULTRUSION MEMBER AND METHOD OF MAKING

CROSS-REFERENCE TO RELATED APPLICATION

This application claims priority to Provisional Application 62/660,705, filed Apr. 20, 2018 which is herein incorporated by reference in its entirety.

FIELD

The present disclosure relates generally to a pultrusion member, and more specifically to a reinforced pultrusion member and method of making the same.

BACKGROUND

Pultrusion is a known technique in which longitudinally continuous fibrous elements, which can include reinforcing fibers and/or a reinforcing mat, are combined into a resin-based structure. The process generally involves pulling the reinforcing fibers through a bath of thermoset resin and then into a heated forming die. The heat of the die cures the resin as the part is pulled through the die on a continuous basis.

SUMMARY

Various aspects of the present disclosure are directed toward apparatuses, systems, and methods that relate to a reinforced pultruded profile.

In some examples, the reinforced pultruded profile includes a top edge, a bottom edge spaced along a vertical axis. The vertical axis extends between the top edge and the bottom edge. The reinforced pultruded profile also includes a transverse axis oriented perpendicular to the vertical axis and a machine axis oriented along a length of the profile. The reinforced pultruded profile includes a first reinforcing layer spaced along the vertical axis and oriented along the transverse axis. The first reinforcing layer includes a plurality of longitudinal rovings, a reinforcing structure including a reinforcing mat, and a resin matrix surrounding the longitudinal rovings and reinforcing structure. The reinforced pultruded profile also includes a second reinforcing layer spaced along the vertical axis and oriented along the transverse axis. The second reinforcing layer includes a plurality of longitudinal rovings, a reinforcing structure including a reinforcing mat, and a resin matrix surrounding the longitudinal rovings and reinforcing structure. The reinforced pultruded profile also includes a first structural layer located between the first reinforcing layer and the second reinforcing layer. The first structural layer has a optionally has a modulus of elasticity of at least 175 GPa.

Some examples are directed toward apparatuses, systems, and methods that relate to a method for pultruding a pultruded part having a reinforced pultruded profile. The method includes providing a plurality of rovings oriented along the longitudinal axis. The method also includes providing a reinforcing structure having a plurality of fibers oriented along the transverse axis and providing a structural member oriented along the longitudinal axis. A resin matrix is combined with the plurality of rovings and the reinforcing structure to create at least one reinforcing layer. The plurality of rovings and the reinforcing structure are substantially surrounded by the resin matrix. The method also includes feeding the reinforcing layer and structural member into a pultrusion die to form a pultruded part. The method also includes pulling the pultruded part from the pultrusion die.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Pultrusion is a known technique used to produce a variety of structures. In one embodiment, a pultruded profile generally includes a top edge, a bottom edge, a vertical axis extending from the top edge to the bottom edge, a transverse axis perpendicular to the vertical axis, and a machine axis oriented along a length of the profile. The profile also includes a first reinforcing layer, a second reinforcing layer, and a first structural layer located between the first and second reinforcing layers.

Figure 1:
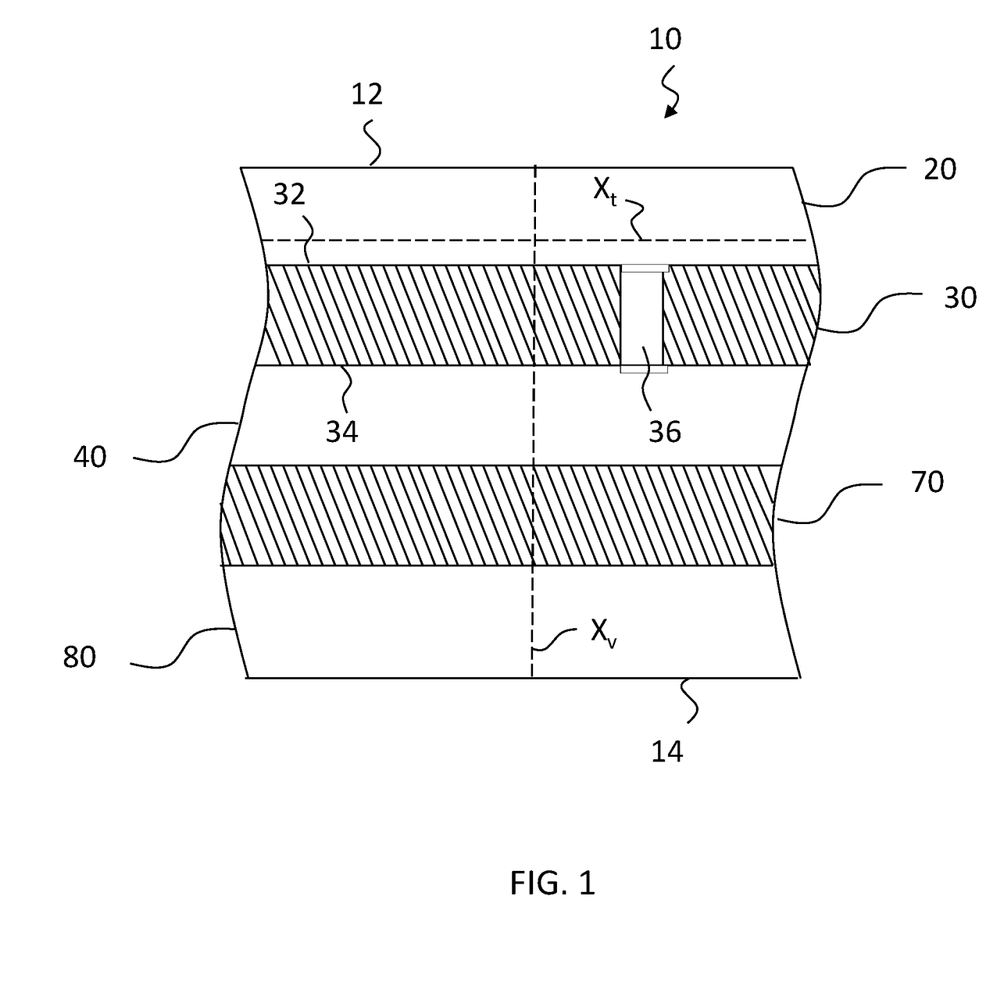
FIG. 1 is a cross-sectional view of a pultruded profile, according to an embodiment.

As shown in FIG. 1, the pultruded profile 10, also referred to herein simply as profile 10, includes a first reinforcing layer 20, a first structural layer 30, and a second reinforcing layer 40 spaced along the vertical axis $X_v$ between the top edge 12 and bottom edge 14 of the profile 10. The first reinforcing layer 20, the first structural layer 30, and the second reinforcing layer 40, referred to collectively herein as "layers," are oriented along the transverse axis $X_t$. In some embodiments, the layers form discrete layers.

Figure 2:
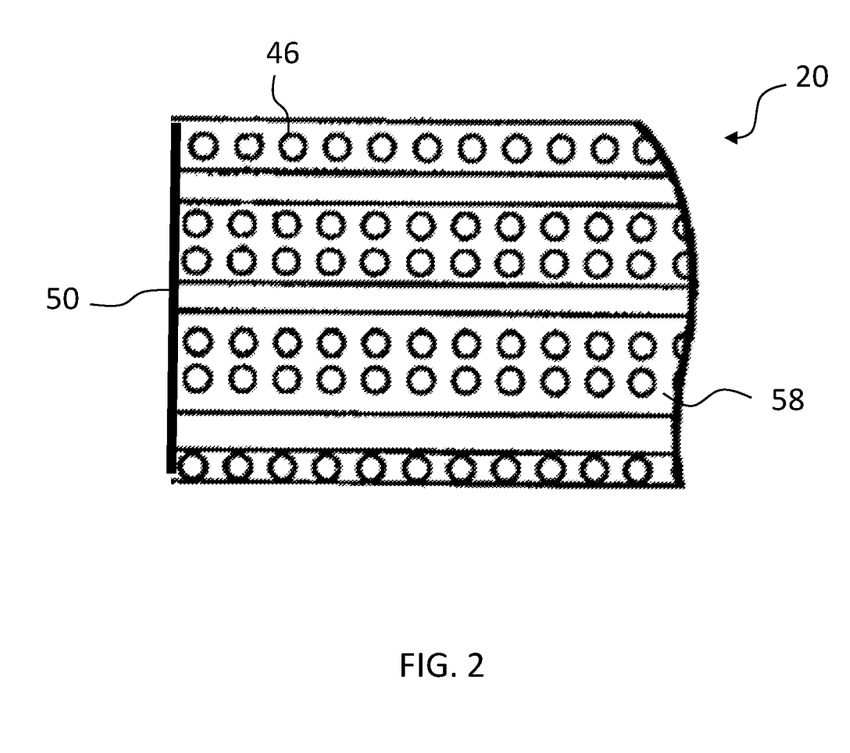
FIG. 2 is a cross sectional view of a reinforcing layer, according to an embodiment.

In some embodiments, the first reinforcing layer 20 and second reinforcing layer 40 include a plurality of reinforcing fibers known as rovings 46, as shown in FIG. 2. As used herein, rovings 46 can generally be defined as bundles or groupings of hundreds or thousands of thin, threadlike filaments including, for example, glass fibers, natural fibers, carbon fibers, metal fibers, ceramic fibers, synthetic or polymeric fibers, composite fibers, or a combination thereof. In various embodiments, the rovings 46 are oriented longitudinally along the machine axis $X_m$ (FIG. 4), which is also referred to herein as a longitudinal axis, a pultruded axis, or more generally, the pull direction. The longitudinal orientation of the rovings 46 provides the material longitudinal strength, which may prevent the material from tearing during the pultrusion process.

Figure 3:
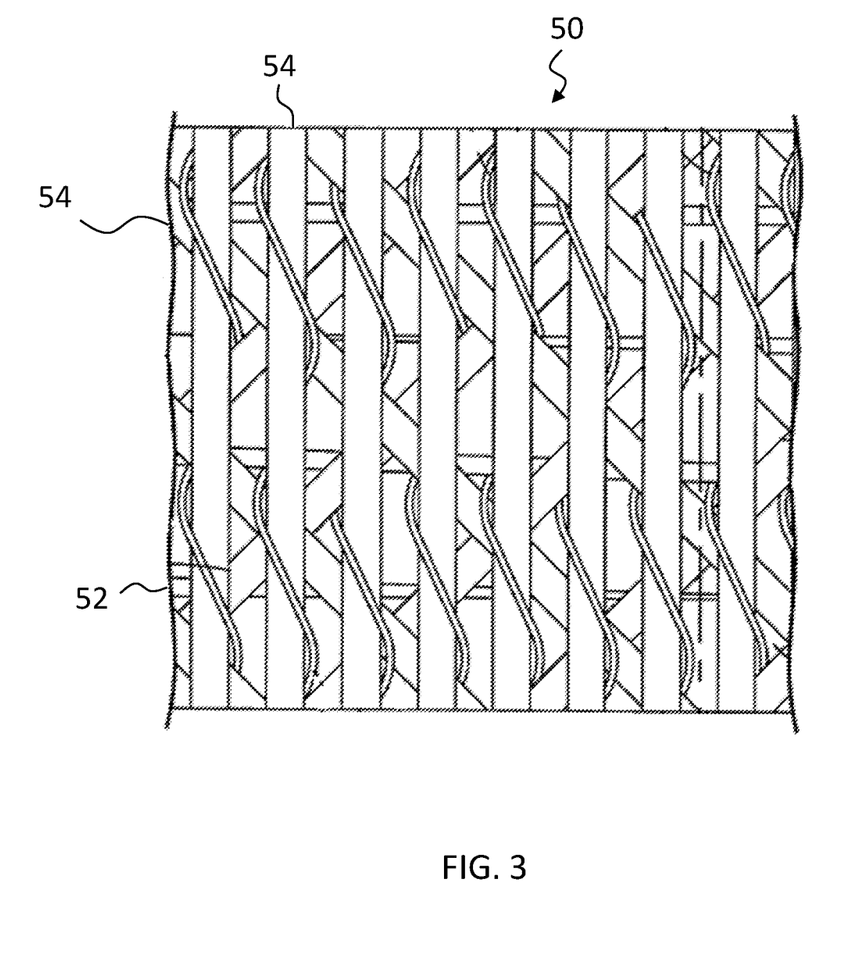
FIG. 3 is a top-down view of a reinforcing mat, according to an embodiment.

The first reinforcing layer 20 and second reinforcing layer 40 also include a reinforcing mat 50. As shown in FIG. 3, the reinforcing mat 50 includes transverse reinforcing fibers 52 oriented along the transverse axis $X_t$. These transverse reinforcing fibers 52 generally provide strength or reinforcement in the transverse direction (e.g., along the transverse axis $X_t$) by resisting transverse or shear forces, which may prevent the material from twisting or otherwise deforming during the pultrusion process. In some embodiments, the reinforcing mat 50 can also include additional types of reinforcing fibers interwoven with the transverse reinforcing fibers, which may further increase the strength of the reinforcing mat. For example, the reinforcing mat 50 can include angled reinforcing fibers 54 oriented at an angle (e.g., at a 45° angle or any other suitable angle) from the transverse reinforcing fibers 52 or vertical transverse fibers 56 oriented along the vertical axis $X_v$ and perpendicular to the transverse reinforcing fibers 52. Any combination of various types of reinforcing fibers can be used as desired. The desired combination and orientation of fibers may depend on a variety of factors, including the desired strength of the reinforcing mat 50 or resultant pultruded part. Examples of various combinations and orientations of reinforcing fibers within a reinforcing mat 50 can be found in U.S. Patent Application No. 2002/0123288A1 to Davies et al. published on Sep. 5, 2002.

The rovings 46 and the reinforcing mat 50 are surrounded by a resin matrix 58 that generally impregnates the rovings 46 and reinforcing mat 50 to bind the fibers together and create a reinforcing layer. In some embodiments, the resin matrix 58 may comprise a thermosetting polymer such as vinyl esters, epoxies, polyesters, phenol-resins, methacrylate resins, polyurethanes, and various thermoplastics, among others. In some embodiments, the thermosetting polymer may be combined with other components to form a resin formulation. For example, a thermoset polyester resin may also contain a reactive diluent such as styrene, as well as a hardener, a catalyst, inorganic fillers, a suitable surface modifier, and a die lubricant. Suitable resins are disclosed in U.S. Pat. No. 4,752,513 to Rau et al., U.S. Pat. No. 5,908, 689 to Dana et al., and U.S. Pat. No. 5,910,458 to Beer et al.

As shown in FIG. 1, the first structural layer 30 is located between the first reinforcing layer 20 and the second reinforcing layer 40. For example, the first reinforcing layer 20 may be adjacent a top side 32 of the first structural layer 30 and the second reinforcing layer 40 may be adjacent a bottom side 34 of the first structural layer 30.

As discussed above, the layers may form discrete layers spaced from one another along the vertical axis $X_v$. In some embodiments, the layers may be spaced uniformly along the vertical axis $X_v$. In other terms, each layer may have the approximately the same thickness. In other embodiments, the layers may not be spaced uniformly. For example, the first reinforcing layer 20 and second reinforcing layer 40 can have a different thickness than the first structural layer 30, or the first reinforcing layer 20 can have a different thickness than the second structural layer 40. In some embodiments, the layers are spaced at least 0.125 inches from one another. In other embodiments, the layers may be spaced from 0.125 inches to 0.5 inches from one another, from 0.125 to 0.375 inches from one another, or from 0.125 to 0.25 inches from one another.

In various embodiments, the first structural layer 30 may comprise a variety of structural materials such as stainless steel, galvanized steel, aluminum, various composite materials, and other suitable metals. For example, the first structural layer 30 can include a stainless steel sheet, ribbon, or wire. In some embodiments, the first structural layer 30 is comprised of a material having a modulus of elasticity (i.e., Young's Modulus) greater than 175 GPa. For example, the modulus of elasticity may be from 175 GPa to 210 GPa. As used herein, modulus of elasticity, also known as Young's Modulus, coefficient of elasticity, elasticity modulus, or elastic modulus, refers to a tensile elasticity of the material or the tendency of an object to deform along a given axis when opposing forces are applied along that axis. In other terms, modulus of elasticity is defined as a ratio of the tensile stress to the tensile strain of the material.

Figure 4:
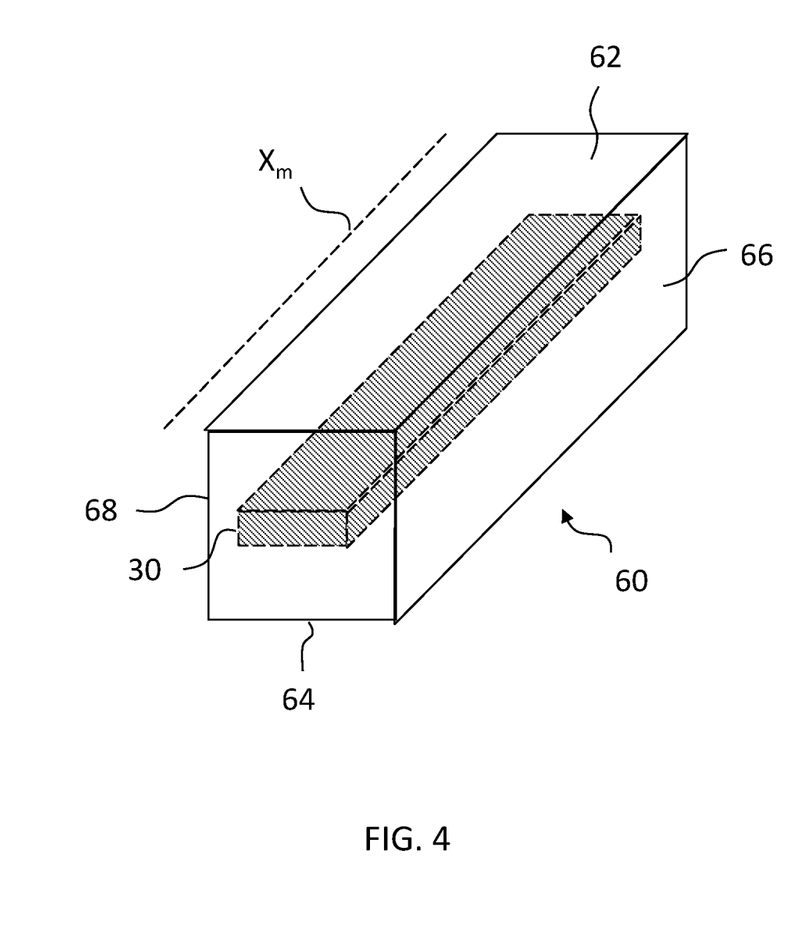
FIG. 4 is a perspective view of a pultruded part, according to an embodiment.

The first structural layer 30 can be any variety of shapes and sizes as desired. As shown in FIG. 4, the first structural layer 30 may be rectangular or ribbon-like. In other embodiments, the first structural layer 30 can be a variety of other shapes including, for example, a ribbon, a sheet, a tube, a wire, a braid, or any other suitable shape as desired. In various examples, the size and/or shape of the first structural layer 30 may depend on the number of layers and/or the orientation or arrangement of the layers within pultruded part 60. For example, the first structural layer 30 may have a height and a width so to fit more than one structural layer 30 within the desired dimensions of the pultruded part 60.

In some embodiments, the first structural layer 30 comprises an aperture 36 (FIG. 1). The first structural layer 30 may have only one aperture 36 or may have multiple apertures 36 spaced along the transverse axis $X_t$ of the first structural layer 30. In some embodiments, the aperture 36 extends through the entirety of the first structural layer 30, as shown in FIG. 1. In other embodiments, the aperture 36 might extend through only a portion of the first structural layer 30. For example, the aperture 36 may be any of a hole, a dimple, a divot, a slot, or a perforation that allows the resin matrix 58 of the adjacent reinforcing layers to at least partially impregnate the first structural layer 30. In certain examples, impregnation of the resin matrix 58 into the first structural layer 30 may aid in binding of the first structural layer 30 to the adjacent reinforcing layers. In other embodiments, the top side 32 and/or the bottom side 34 of the first structural layer 30 may be texturized in order to facilitate binding of the first structural layer 30 to the adjacent reinforcing layers.

In some embodiments, the pultruded profile 10 includes a third reinforcing layer 80 and a second structural layer 70 between the second reinforcing layer 40 and the third reinforcing layer 80. In other embodiments, the pultruded profile 10 can include any number of alternating reinforcing layers and structural layers as desired, which may depend on the desired dimensions of the pultruded profile, the thickness of each layer, or the desired strength of the resultant pultruded part, among other things.

FIG. 4 shows a pultruded part 60 for use, for example, in fenestration products such as windows, doors, and other structural products. The pultruded part 60 is shown herein as rectangular in shape (e.g., having a rectangular cross-section). The pultruded part 60 has a top side 62, a bottom side 64, a first side 66, and a second side 68.

As shown, the pultruded part 60 includes a first structural layer 30 oriented along the machine axis $X_m$ or longitudinal axis of the pultruded part 60. The structural layer 30 is sandwiched between reinforcing layers (not shown) and held in place by a reinforcing matrix (not shown). In some embodiments, the pultruded part 60 may include additional reinforcing layers around a perimeter of the pultruded part 60 or, in other terms, oriented along the first side 66 and the second side 68 of the pultruded part 60 so that the structural layer 30 is spaced from the first side 66 and the second side 68 as desired.

FIG. 4 shows the first structural layer 30 positioned centrally within the pultruded part 60. However, the first structural layer 30 can be positioned at any location within the pultruded part 60 as desired. The location of the first structural layer 30 may depend on a variety of factors including the number of structural layers desired, the size and/or dimensions of the pultruded part 60, and the desired strength of the pultruded part 60.

Figure 5A:
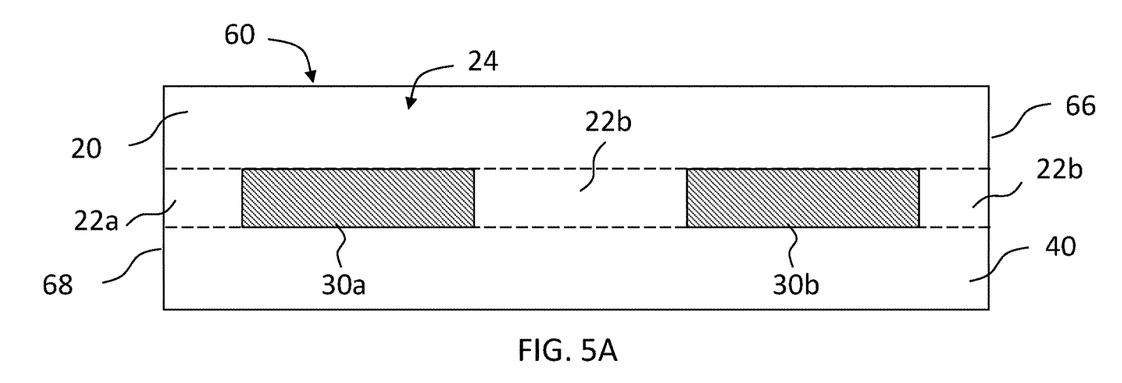
FIGS. 5A-C are cross-sectional views of a pultruded part, according to various embodiments.
Figure 5B:
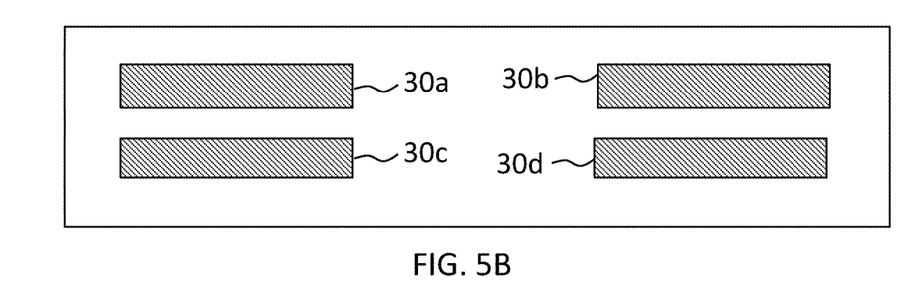
Figure 5C:
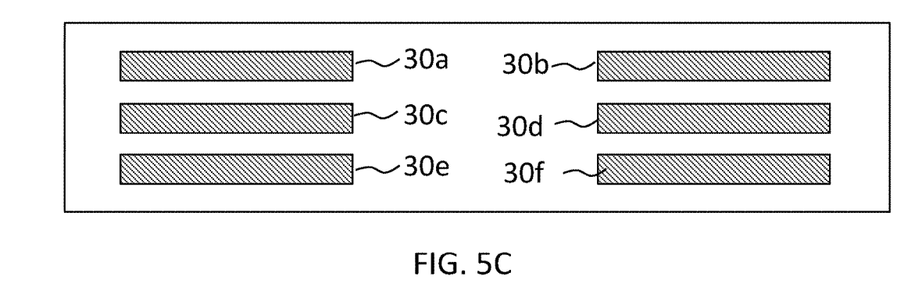

FIGS. 5A-C show various arrangements of structural layers within the pultruded part 60, according to some examples. FIG. 5A shows a pultruded part 60 with a first structural layer 30a and a second structural layer 30b spaced from one another along the transverse axis $X_t$. The pultruded part 60 also includes at least two reinforcing layers 20 and 40 and additional reinforcing segments 22a, 22b, and 22c, which space the structural layer 310 from the first side 66 and the second side 68 of the pultruded part 60. The reinforcing layers 20 and 40 and the reinforcing segments 22a, 22b and 22c create a reinforcing structure 24, which position the structural layers within the pultruded part 60.

FIGS. 5B and 5C show two additional examples of a pultruded part 60 with varying arrangements of structural layers within the reinforcing structure X. FIG. 5B shows a pultruded part 60 having four structural layers 30a-d. FIG. 5C shows a pultruded part 60 having six structural layers 30a-f. FIGS. 5A-C are intended only as examples and are not intended to be construed as limiting in any regard. Thus, as discussed above, any number and arrangement of structural layers, reinforcing layers, and/or reinforcing segments may be used as desired.

Figure 6:
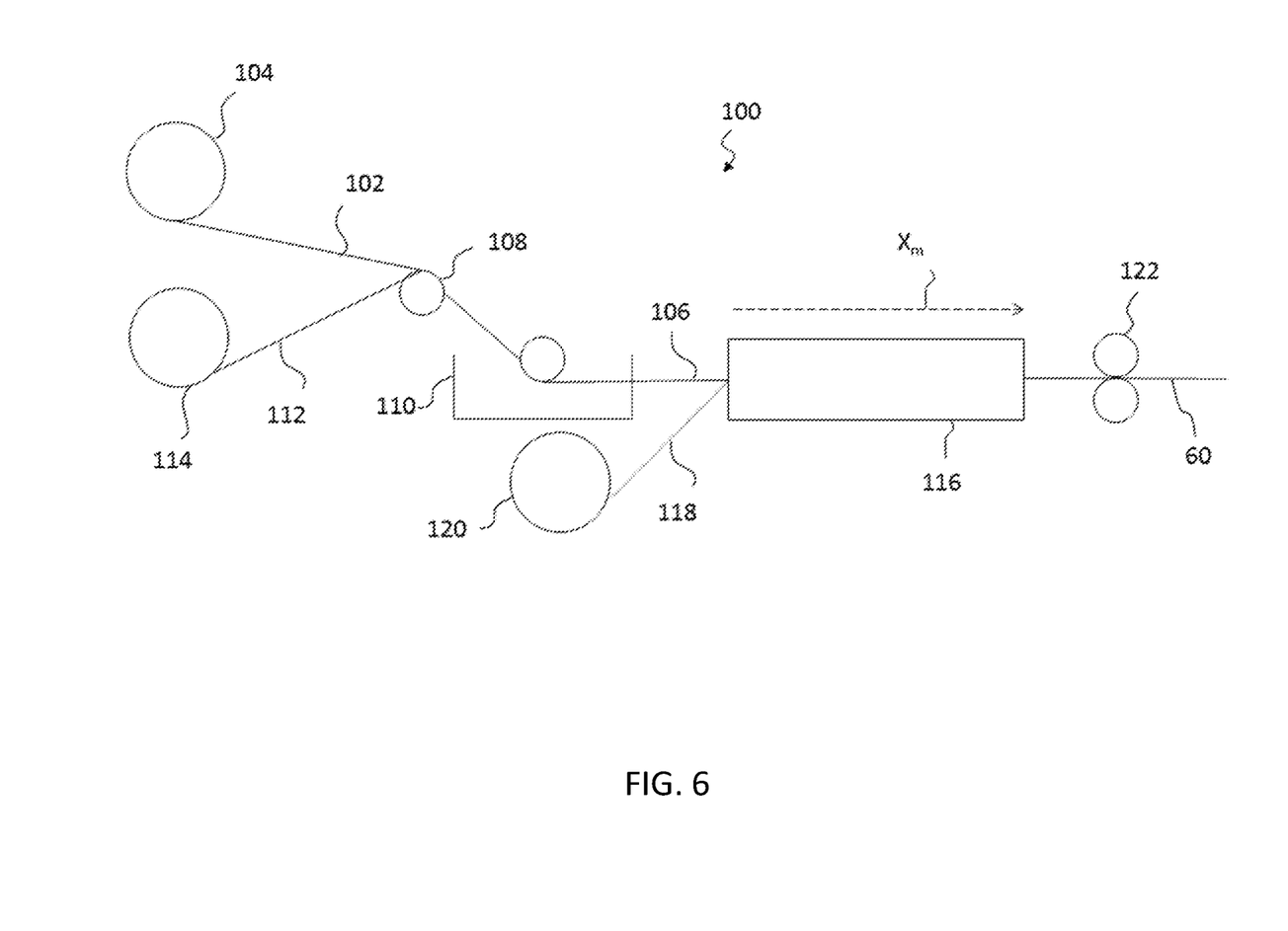
FIG. 6 is a schematic diagram of a pultrusion process, according to an embodiment.

FIG. 6 illustrates a pultrusion system 100 for pultruding a pultruded part 60 having a reinforced pultruded profile 10. In some embodiments, the pultrusion system 100 includes a plurality of rovings 102 originating from a first source roll 104. The plurality of rovings 102 are oriented along the machine axis $X_m$ of a pultrusion die 106. The rovings 102 pass over a roller 108 and are fed into a resin bath 110.

The pultrusion system 100 also includes a reinforcing mat 112 oriented along the machine axis $X_m$. As discussed above, the reinforcing mat 112 can include a variety of reinforcing fibers interwoven in various directions. The reinforcing mat 112 originates from a second source roll 114, passes over the roller 108 and into the resin bath 110. The rovings 102 and reinforcing mat 112 are combined with a resin matrix in the resin bath 110 to create at least one reinforcing layer 106. In various embodiments, the pultrusion system 100 may include any number of source rolls for supplying the plurality of rovings 102 and/or the reinforcing mat 112 and resin baths 110 as required for the desired number or arrangement of reinforcing layers 106 within the pultruded part 60.

The reinforcing layer 106 is then fed into a pultrusion die 116. The pultrusion die 116 generally has a profile corresponding to the desired shape of the final product. In some embodiments, the reinforcing layer 106 may be shaped or formed to fit the pultrusion die 116 before being fed into the pultrusion die 116.

The pultrusion system 100 also includes a structural member 118 originating from a third source roll 120. In some embodiments, the third source roll 120 may provide a continuous feed of metal ribbon, wire, or any other sufficient structural material discussed above. In other embodiments, the source roll 120 may provide the structural member 118 in discrete, pre-cut segments or batches. The structural member 118 is then sandwiched between the reinforcing layers 106 as the reinforcing layers 106 are fed into the pultrusion die 116. In one example, where there are two reinforcing layers and a structural member, the structural member will be positioned between the first reinforcing layer and the second reinforcing layer before being fed into the pultrusion die 116. As discussed above, the pultrusion system 100 may include any number of source rolls for supplying structural members 118 required for the desired number or arrangement of structural layers within the pultruded part 60.

In some embodiments, the structural member 118 may be treated, texturized or perforated prior to being sandwiched between the reinforcing layers 106 and fed into the pultrusion die 116. For example, the pultrusion system 100 may include an optional texturizing mechanism such as a drill, a perforator, a press, a laser, a chemical bath, or any other device capable of machining a surface of the structural member 118 as it leaves the third source roll 120. For example, in some embodiments, the texturizing mechanism may form a plurality of apertures spaced along the longitudinal axis of the structural member 118.

Once the structural member 118 and reinforcing layers 106 are inside the pultrusion die 116, the resin matrix is at least partially cured to facilitate binding of the rovings 102 and the reinforcing mat 112 with the structural member 118 to create a pultruded part 60. The pultruded part 60 is then pulled from the pultrusion die 116 by a pulling mechanism 122 such as, for example, a pair of opposing rollers or any other such pulling apparatus.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

What is claimed is:

1. A reinforced pultruded profile having a top edge, a bottom edge spaced along a vertical axis extending between the top edge and the bottom edge, a transverse axis oriented perpendicular to the vertical axis, and a machine axis oriented along a length of the profile, the pultruded profile comprising:
   a first reinforcing layer spaced along the vertical axis and oriented along the transverse axis, the first reinforcing layer including a first plurality of longitudinal rovings, a first reinforcing structure comprising a first reinforcing mat, and a first resin matrix surrounding the first longitudinal rovings and the first reinforcing structure;
   a second reinforcing layer spaced along the vertical axis and oriented along the transverse axis, the second reinforcing layer including a second plurality of longitudinal rovings, a second reinforcing structure comprising a second reinforcing mat, and a second resin matrix surrounding the second longitudinal rovings and the second reinforcing structure; and
   a first structural layer in the form of a continuous ribbon of material located between the first reinforcing layer and the second reinforcing layer, the first structural layer having at least one aperture extending through a thickness of the first structure layer, the first structural layer having a modulus of elasticity of at least 175 GPa, wherein at least one of the first resin matrix or the second resin matrix at least partially impregnate the aperture extending through the thickness of the first structural layer.

2. The pultruded profile of claim 1, further comprising a third reinforcing layer spaced along the vertical axis, the third reinforcing layer including a third plurality of longitudinal rovings, a third reinforcing structure comprising a third reinforcing mat, and a third resin matrix surrounding the third longitudinal rovings and the third reinforcing structure.

3. The pultruded profile of claim 2, further comprising a second structural layer located between the second reinforcing layer and the third reinforcing layer, the second structural layer having a modulus of elasticity of at least 175 GPa.

4. The pultruded profile of claim 3, wherein the second structural layer includes at least one aperture extending through a thickness of the second structural layer.

5. The pultruded profile of claim 1, wherein the first reinforcing mat comprises a first plurality of fibers oriented along the transverse axis.

6. The pultruded profile of claim 5, wherein the first plurality of fibers include a first plurality of staple fibers attached to a first plurality of reinforcing fibers.

7. The pultruded profile of claim 5, wherein the first plurality of reinforcing fibers comprises at least one selected from the group consisting of glass, carbon, metal, ceramic, synthetic or polymeric materials, composite materials, organic materials, or a combination thereof.

8. The pultruded profile of claim 1, wherein the first structural layer comprises a continuous steel ribbon.

9. The pultruded profile of claim 1, wherein the first reinforcing layer has a different thickness than the second reinforcing layer.

10. The pultruded profile of claim 1, wherein the first reinforcing layer and the second reinforcing layer each have a different thickness than that of the first structural layer.

11. The pultruded profile of claim 1, wherein the first resin matrix comprises a thermosetting polyester.

12. The pultruded profile of claim 1, wherein the first reinforcing structure further comprises a first binder comprising at least one of latex, a polyvinyl acetate emulsion, and a crosslinking polyvinyl acetate emulsion.

* * * * *